United States Patent [19]

Biondetti

[11] Patent Number: 5,146,664

[45] Date of Patent: Sep. 15, 1992

[54] CONTROLLED DEFLECTION ROLL

[75] Inventor: Mario Biondetti, Venice, Italy

[73] Assignee: Sulzer-Escher Wyss GmbH, Ravensburg, Fed. Rep. of Germany

[21] Appl. No.: 669,961

[22] Filed: Mar. 15, 1991

[30] Foreign Application Priority Data

Mar. 20, 1990 [CH] Switzerland ............ 915/90

[51] Int. Cl.$^5$ ............................................. B21B 13/02
[52] U.S. Cl. .................. 29/116.2; 29/113.2; 29/116.1
[58] Field of Search ............... 29/113.1, 113.2, 116.1, 29/116.2

[56] References Cited

U.S. PATENT DOCUMENTS

| | | |
|---|---|---|
| 3,802,044 | 4/1974 | Spillmann et al. |
| 3,885,283 | 5/1975 | Biondetti. |
| 4,447,940 | 5/1984 | Appenzeller et al. ............ 29/116.2 |
| 4,757,585 | 7/1988 | Niskanen. |
| 4,827,584 | 5/1989 | Pau et al. ............................ 29/116.2 |
| 4,837,907 | 6/1989 | Roerig et al. ................... 29/116.2 X |
| 4,907,329 | 3/1990 | Boalot ................................ 29/116.2 |
| 4,944,089 | 7/1990 | Flämig et al. ................. 29/116.1 X |
| 4,989,436 | 2/1991 | Setzer et al. .................. 29/116.2 X |

FOREIGN PATENT DOCUMENTS

| | | |
|---|---|---|
| 0241442 | 10/1987 | European Pat. Off. . |
| 0248738 | 12/1987 | European Pat. Off. . |
| 0296006 | 12/1988 | European Pat. Off. . |
| 2230139 | 1/1973 | Fed. Rep. of Germany . |
| 2254392 | 5/1974 | Fed. Rep. of Germany . |
| 2325721 | 11/1974 | Fed. Rep. of Germany . |
| 3143878 | 8/1982 | Fed. Rep. of Germany ..... 29/116.2 |
| 0196106 | 11/1983 | Japan .................................. 29/116.2 |
| 568105 | 10/1975 | Switzerland . |
| 2143302 | 2/1985 | United Kingdom . |

Primary Examiner—Mark Rosenbaum
Assistant Examiner—C. Richard Martin
Attorney, Agent, or Firm—Sandler, Greenblum & Bernstein

[57] ABSTRACT

In a controlled deflection roll comprising a roll shell rotatable about a stationary support and braced or supported by support elements at the stationary support, a rotational moment is intentionally exerted at the opposite ends of the roll shell by force-exerting elements. These force-exerting elements extend in axial direction of the controlled deflection roll but are offset in spaced relation with respect to the lengthwise axis of the controlled deflection roll. These force-exerting elements operate in pairs in opposite directions with respect to one another. A lever arm is formed by the distance or spacing between the force-exerting elements and such lever arm exerts a greater rotational moment in the presence of modest space requirements and without deformation of the roll shell.

15 Claims, 5 Drawing Sheets

CONTROLLED DEFLECTION ROLL

BACKGROUND OF THE INVENTION

1. Field of the Invention

The present invention broadly relates to a new and improved construction of a controlled deflection roll, also referred to in the art as a roll with bending or sag compensation.

In its more particular aspects the present invention relates to an improved construction of a controlled deflection roll comprising a roll shell rotatable about a stationary or non-rotatable support, the rotatable roll shell being supported or braced at the stationary support by means of at least one support device exerting a pressing force in a pressing plane. Approximately at the region of the ends of the roll shell there are provided devices for exerting a rotational moment and having an axis extending substantially perpendicular to the pressing plane.

2. Discussion of the Background and Material Information

Controlled deflection rolls are well known to the art, for example, from U.S. Pat. No. 3,802,044 and the cognate Federal Republic of Germany Patent No. 2,230,139, published Jan. 25, 1973 as well as U.S. Pat. No. 3,885,283 and the cognate Federal Republic of Germany Patent No. 2,230,139, published May 9, 1974. In these prior constructions of controlled deflection rolls a row of hydrostatic support elements braces or supports the rotatable roll shell or jacket against the non-rotatable or stationary support or beam. However, it is also known in this technology to support the rotatable roll shell throughout its entire length in relation to the stationary support or beam by one or a number of different types of support devices, such as hydrodynamic, magnetic or other support elements or even by means of one or a number of pressure chambers. Moreover, the controlled deflection rolls may be of the type where the opposite ends of the roll shell are mounted, for example, by means of pendulum bearings at the stationary support, or, however, there may be provided controlled deflection rolls of the type where also the opposite ends of the roll shell are freely movable at least in the pressing direction or are guided by a guide device.

With such controlled deflection rolls it has been found to be advantageous to provide, in addition to the pressing action of the support elements, devices at the opposite ends of the roll shell which intentionally exert at the opposite ends of the roll shell a force or rotational moment or torque having an axis disposed perpendicular to the pressing plane. However, the application of such rotational moment at the roll shell through the opposite ends of the roll shell is associated with disturbing disadvantages in such state-of-the-art controlled deflection rolls.

From the Federal Republic of Germany Patent No. 2,325,721 and the cognate Swiss Patent No. 568,105, published Oct. 10, 1975, it is known, for instance, to provide at the opposite ends of the roll shell, in addition to the radially effective support elements, axially offset, but likewise radially acting support elements which, however, are effective in the opposite direction. With simultaneous operation of the counter support elements and the neighboring support elements there is here thus produced at the opposite ends of the roll shell the desired rotational moment or torque. What is disadvantageous with this prior art construction of controlled deflection roll is that, by virtue of the pressing forces exerted upon the roll shell by the counter support elements and the support elements, the roll shell is deformed in a difficult to control manner, and moreover, at the different points of action of the counter support elements and the support elements the roll shell is caused to assume an undefined oval shape. Additionally, the magnitude of the thus produced force or rotational moment is limited.

In U.S. Pat. No. 4,757,585 or the European Patent Application No. 0,241,442, published Oct. 14, 1987, there are also disclosed controlled deflection rolls where the support elements effective radially at the opposite ends of the roll shell in opposite directions do not act directly upon the opposite ends of the roll shell, rather upon the cylindrical inner surface of a respective sleeve inserted into the opposite ends of the roll shell, or else axially upon a shoulder at the opposite ends of the roll shell and which carries the bearings at the stationary support externally of the roll shell. Here, what is deemed to be a shortcoming is the complicated construction of the controlled deflection roll or crown roll as well as the space requirements needed for the sleeves, resulting in weakening of the stationary support at the opposite ends of the roll shell.

SUMMARY OF THE INVENTION

Therefore, with the foregoing in mind, it is a primary object of the present invention to provide an improved construction of controlled deflection roll which is not afflicted with the shortcomings and limitations of the prior art as explained heretofore.

Another and more specific object of the present invention aims at devising an improved controlled deflection roll which avoids or at least substantially minimizes the drawbacks of the prior art constructions, and there can be applied to the opposite ends of the roll shell a greater rotational moment in a relatively constructionally simple manner and while avoiding any deformation or at least any appreciable deformation of the roll shell.

Still a further noteworthy object of the present invention is concerned with the provision of an improved construction of controlled deflection roll which is relatively simple in construction and design, highly reliable in operation, not readily subject to breakdown or malfunction and requires a minimum of maintenance and servicing.

Now in order to implement these and still further objects of the present invention, which will become more readily apparent as the description proceeds, the controlled deflection roll of the present development is manifested, among other things, by the features that the devices for exerting or generating a rotational moment comprises at least one pair of force-exerting elements arranged approximately parallel to the direction of extent of the lengthwise axis of the stationary support and effective at a distance or spacing from the lengthwise axis of the stationary support.

Since the force-exerting elements are effective axially instead of radially there is beneficially avoided deformation of the roll shell, that is to say, there is precluded or at least substantially minimized any deviation from the essentially circular shape of the roll shell. As a result, there do not arise any irregularities in the line force exerted at the roll nip or gap, and this result is desirably achieved without the need to resort to a complicated design of the controlled deflection roll. Additionally, with modest spatial requirements there can be produced a greater rotational moment or torque.

It is particularly advantageous to provide at least two pairs of force-exerting elements arranged at different sides of the stationary support and its lengthwise axis and effective in a direction substantially parallel to the axial direction or the direction of extent of the lengthwise axis of the stationary support. In this way, there is present as large as possible lever arm for exerting or generating the rotational moment or torque. Moreover, the bearings of the guide device are loaded-relieved with respect to axial forces to the extent that such bearings are even present.

Additionally, it is beneficial that both pairs of force-exerting elements are parallely offset or displaced with respect to the lengthwise axis of the stationary support, and do not extend coincident with the axial direction of the stationary support, so that in the axial direction of the stationary support there is not required any space.

Advantageously, the force-exerting elements can be arranged between a flange mounted at the stationary support and a ring inserted into the end of the roll shell. It is of particular advantage to provide the flange in the middle of or intermediate two rings provided at a certain axial distance or spacing from one another at the associated end of the roll shell, and the force-exerting elements are effective in both directions substantially parallel to the lengthwise axis of the stationary support. Moreover, the force-exerting elements located at the pressing side and effective in one direction are always controlled in conjunction with the force-exerting elements located at the opposite side and which are effective in the opposite or counter direction, in other words, such force-exerting elements are mutually controlled crosswise.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2b is a view similar to the showing of FIG. 2a of a modification of the controlled deflection roll of FIG. 2a;

FIG. 3a is a radial sectional view showing details of an embodiment of controlled deflection roll, the section being taken substantially along the section line A—A of FIG. 2a;

FIG. 3b is a radial sectional view showing details of another embodiment of controlled deflection roll, the section again being taken substantially along the section line A—A of FIG. 2a.

DETAILED DESCRIPTION OF THE PREFERRED EMBODIMENTS

Figure 1:
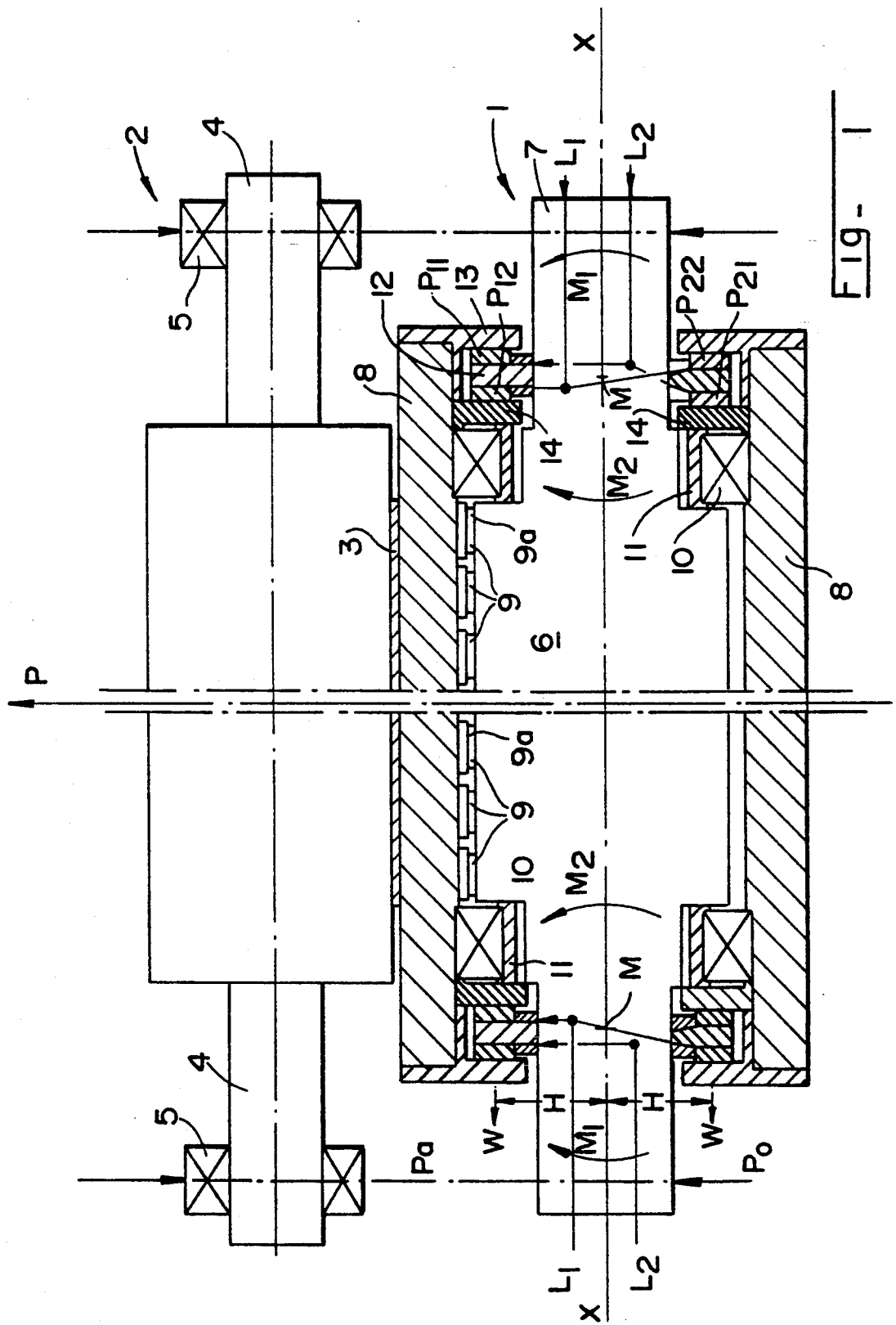
FIG. 1 schematically illustrates a rolling apparatus or mill containing a controlled deflection roll constructed according to the invention and depicted in sectional view taken substantially along the pressing plane.

Describing now the drawings, it is to be understood that only enough of the construction of the rolling apparatus or mill and associated controlled deflection roll has been depicted therein, in order to simplify the illustration, as needed for those skilled in the art to readily understand the underlying principles and concepts of the present invention. Turning specifically to the rolling apparatus or rolling mill depicted by way of example in FIG. it will be recognized that a controlled deflection roll I cooperates with a counter roll 2 and exerts a pressing force in a pressing plane P, lying essentially in the plane of the drawing, upon a material web 3 which passes between both the controlled deflection roll 1 and the counter roll 2. This counter roll 2 can be constructed as a conventional roll, for instance, a solid roll, the journals 4 of which are mounted by suitable bearings 5 in a standard and thus not here illustrated roll stand. By means of the bearings 5 there can be exerted a contact- or roll applying-force upon the counter roll 2, and a rotational moment or torque is produced at the roll journals 4 and the opposite ends of the counter roll 2.

The controlled deflection roll 1 comprises a stationary support 6, the opposite ends 7 of which are appropriately fixed against rotation in the roll stand, however are pivotable to a certain degree, for instance by hinge joints or the like as is well known in this technology. A roll shell 8 is mounted for rotation about the stationary support 6. This rotatable roll shell 8 is supported at the stationary support 6 by means of a row of support devices 9. By means of these support devices 9 there is exerted a pressing or support force in a predetermined pressing direction upon the roll shell 8 and thus against the counter roll 2. As a result, there is applied to the material web 3 the desired press or pressing treatment.

The support devices 9 can be constructed, for instance, as hydrostatic support elements 9a, as disclosed, for example, in the aforementioned U.S. Pat. No. 3,802,044 and the cognate Federal Republic of Germany Patent No. 2,230,139, published Jan. 25, 1973, to which reference may be readily had and the disclosure of which is incorporated in its entirety herein by reference. However, the support devices 9 also can be constructed in a different manner, for example, as hydrodynamic support elements, magnetic support elements or support elements working with spring or resilient forces, or else as pressure cushions or pressure chambers, all as well known in this art. Moreover, there can be also used a single support device effective over the entire length of the controlled deflection roll 1, which may be constituted by either a conventional support ledge or a pressure chamber. There can be furthermore used a row of support elements arranged in juxtaposition in axial direction of the controlled deflection roll 1, resulting in the beneficial capability of individual control of the pressing force throughout the full length of the controlled deflection roll.

The opposite ends or end regions of the rotatable roll shell 8 can be rotatably mounted directly upon the stationary support 6 by means of pendulum bearings 10, as taught, for instance, in the aforementioned U.S. Pat. No. 3,802,044 and the cognate Federal Republic of Germany Patent No. 2,230,139. Moreover, the opposite ends of the rotatable roll shell 8 can be freely movable in the pressing direction with a certain amount of play in that the opposite ends of the roll shell 8 are mounted by means of the pendulum roller bearings 10 upon a non-rotatable guide device or means 11 which is radially displaceable in relation to the stationary support 6 in the predetermined pressing direction, as such has been disclosed in the aforementioned U.S. Pat. No. 3,885,283 and the cognate Federal Republic of Germany Patent No. 2,230,139, to which reference may be readily had and the disclosure of which is incorporated herein in its entirety by reference.

In order to be able to optimumly compensate with respect to one another the rotational moments emanating from the journal contact forces of the counter roll 2 and the bending lines of both of the coacting rolls 1 and 2, there are provided devices for producing a rotational moment or torque having an axis or moment axis M extending substantially perpendicular to the pressing plane P. These rotational moment-generating devices, to be considered in greater detail shortly hereinafter, are arranged approximately at the opposite ends of the roll shell 8 externally of the bearings 10. In particular, the rotational moment-generating devices at each roll end comprise force-exerting elements $P_{11}$, $P_{12}$, $P_{21}$ and $P_{22}$. It will be observed that the force-exerting elements $P_{11}$, $P_{12}$, $P_{21}$ and $P_{22}$ are provided at the press or pressing side $P_a$ of the controlled deflection roll 1 as well as also at the opposite side $P_o$ thereof, that is to say, to opposite sides of the lengthwise axis X of the controlled deflection roll 1 and the stationary support 6. The lines of action or effective direction of these force-exerting elements $P_{11}$, $P_{12}$, $P_{21}$ and $P_{22}$ are disposed in the axial direction or the direction of extent of the lengthwise axis X of the controlled deflection roll 1, in other words, in the direction of extent of the lengthwise axis X of the stationary support 6, but at a distance or spacing H from such lengthwise axis X.

In the illustrated exemplary embodiment, there are provided at each diametrical location of the roll end always two force-exerting elements $P_{11}$, $P_{12}$ and $P_{21}$, $P_{22}$, wherein the force-exerting elements $P_{11}$ and $P_{22}$ of the force-exerting elements $P_{11}$, $P_{12}$, $P_{21}$, and $P_{22}$ are effective in axial direction towards the outside and the other force-exerting elements $P_{12}$ and $P_{21}$ of the force-exerting elements $P_{11}$, $P_{12}$, $P_{21}$, and $P_{22}$ are effective in axial direction towards the inside. It is to be expressly understood that the other or opposite end of the controlled deflection roll 1 is analogously constructed.

Figure 2A:
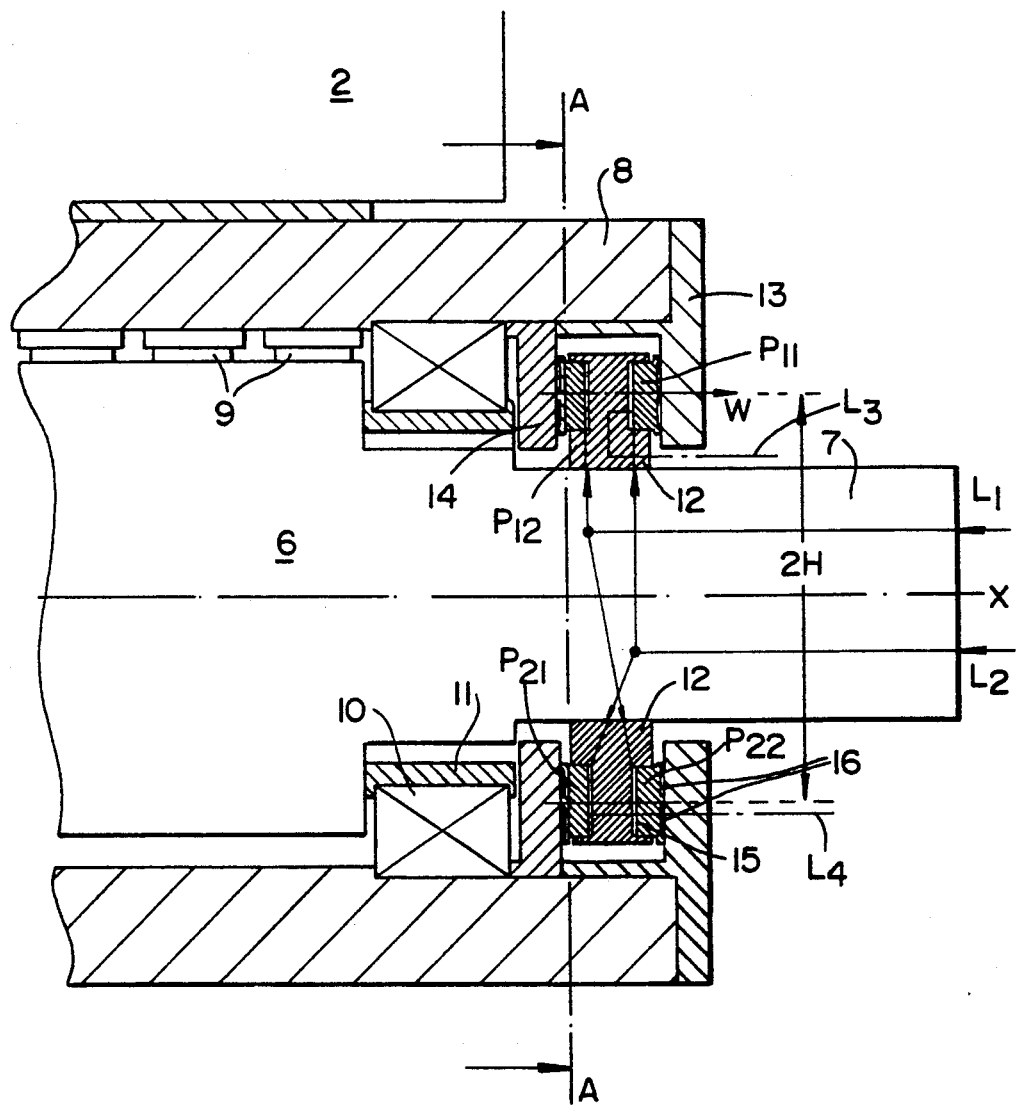
FIG. 2a is an enlarged fragmentary sectional view of one end region of the controlled deflection roll depicted in FIG. 1, the section again being taken substantially along the pressing plane.

As will be particularly well recognized from the enlarged illustration of FIG. 2a, the force-exerting elements $P_{11}$, $P_{12}$, $P_{21}$ and $P_{22}$ are situated between a flange or flange means 12 which is fixedly seated at the associated end 7 of the stationary support 6 and rings or ring members 13 and 14 fixedly inserted into the depicted end of the roll shell 8. More specifically, the outwardly effective force-exerting elements $P_{11}$ and $P_{12}$ are captured between the flange 12 and the outer ring 13 and the inwardly effective force-exerting elements $P_{12}$ and $P_{21}$ are captured between the flange 12 and the inner ring 14.

Figure 2B:
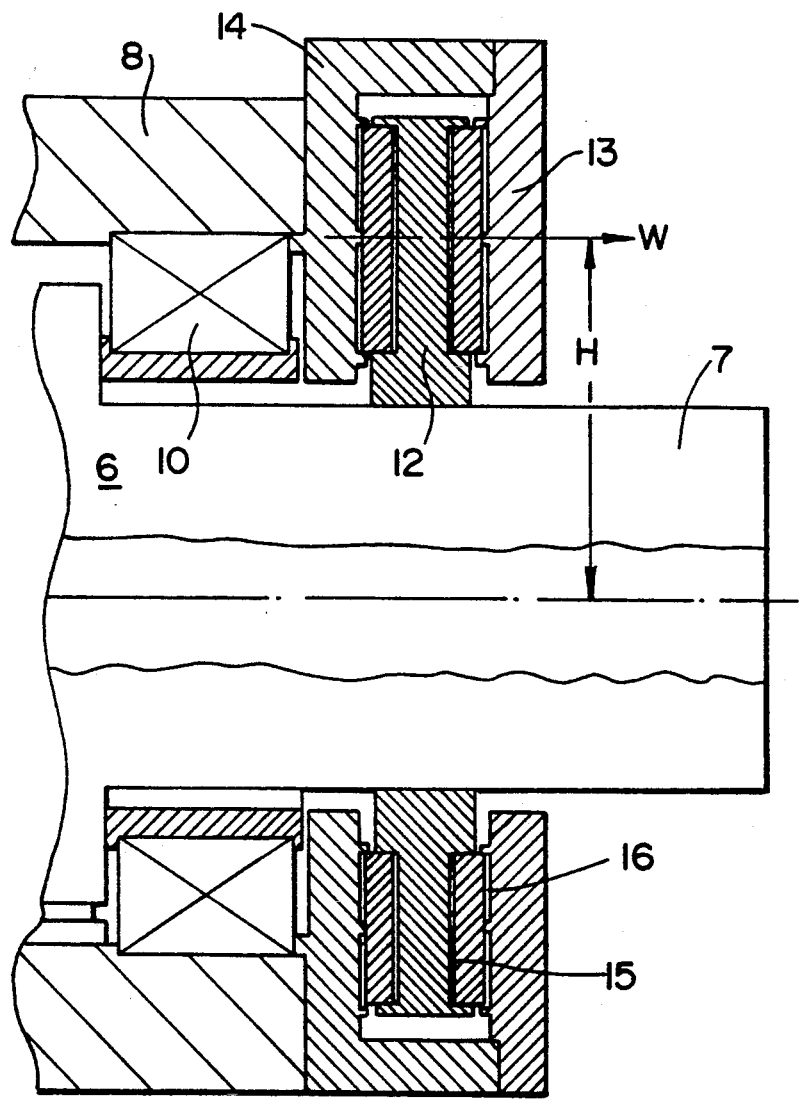

In the embodiment depicted in FIG. 2b, the rings or ring means 13 and 14 are not internally inserted into the opposite ends of the roll shell 8, rather are arranged at the outside. As a result, the lever arm 2H is further enlarged in size, and thus, there can be produced by the force-exerting elements $P_{11}$, $P_{21}$, $P_{21}$ and $P_{22}$, with the same pressing force, a still larger rotational moment $M_1$ or $M_2$ (see FIG. 1).

The force-exerting elements $P_{11}$, $P_{12}$, $P_{21}$ and $P_{22}$ can be constructed, for example, analogous to the support elements 9, likewise as hydrostatic support elements 9a, which are each movable by means of an associated pressure chamber 15 in the operative or effective direction W, that is, in a direction essentially parallel to the direction of the lengthwise axis X of the controlled deflection roll 1 and its stationary support 6. In this case, each of the hydrostatic-type force-exerting elements $P_{11}$, $P_{12}$, $P_{21}$ and $P_{22}$ contain a bearing pocket 16 at their front surface or face which is supplied with a suitable hydrostatic pressurized medium, such as oil, by the associated pressure chamber 15. As a result, there can be ensured an almost frictionless movement of the rings 13 and 14 secured to the roll shell 8 in relation to the force-exerting elements $P_{11}$, $P_{12}$, $P_{21}$ and $P_{22}$.

The pressure chambers 15 of the force-exerting elements $P_{11}$, $P_{12}$, $P_{21}$ and $P_{22}$ are supplied with the hydraulic pressure medium by means of the pressure medium infeed lines or conduits $L_1$ and $L_2$ at a controlled pressure in a manner well known in this art. To that end, the pressure chambers 15 of the press side $P_a$ and opposite side $P_o$ force-exerting elements $P_{11}$, $P_{12}$, $P_{21}$ and $P_{22}$ are interconnected in a crosswise fashion, as shown in FIG. 1, that is to say, there is interconnected the pressure chamber 15 of the force-exerting element $P_{11}$ with the pressure chamber 15 of the force-exerting element $P_{21}$, and conversely, the pressure chamber 15 of the force-exerting element $P_{12}$ is interconnected with the pressure chamber 15 of the force-exerting element $P_{22}$.

Now if the pressure chambers 15 of the force-exerting elements $P_{11}$ and $P_{21}$ are supplied with fluid or hydraulic pressure or pressurized medium by means of the pressurized medium infeed lines $L_2$, while the other pressurized medium infeed line $L_1$ is devoid of pressure, then the force-exerting elements $P_{11}$ and $P_{21}$ exert by means of the lever arm 2H, upon the opposite ends of the roll shell 8, a unidirectional rotational moment $M_2$ having an axis M disposed essentially perpendicular to the pressing plane P. On the other hand, there is produced a rotational moment or torque $M_1$, which is effective in the opposite direction, when the pressure chambers 15 of the force-exerting elements $P_{12}$ and $P_{22}$ are simultaneously impinged with the hydraulic pressure or pressurized medium by means of the pressurized medium infeed line $L_1$. In this manner there can be intentionally generated at the opposite ends of the roll shell 8 an adjustable rotational moment or torque $M_1$ or $M_2$, as desired. Moreover, for the attainment of the required lever arms there is not required any additional space in the axial direction of the controlled deflection roll 1 and there does not arise any deformation of the roll shell 8 through radial forces, in other words, there is advantageously avoided any deviation of the cross-section of the roll shell 8 from its circular or round shape.

It is to be expressly understood that the force-exerting elements $P_{11}$, $P_{12}$, $P_{21}$ and $P_{22}$ can be constructed in a different manner, for example, as hydraulically forwardable or exertable support elements with hydrodynamically lubricated bearing surfaces or roller bearings, provided that the control is accomplished in the manner heretofore described so that there can be generated the requisite rotational moment or torque.

Figure 3B:
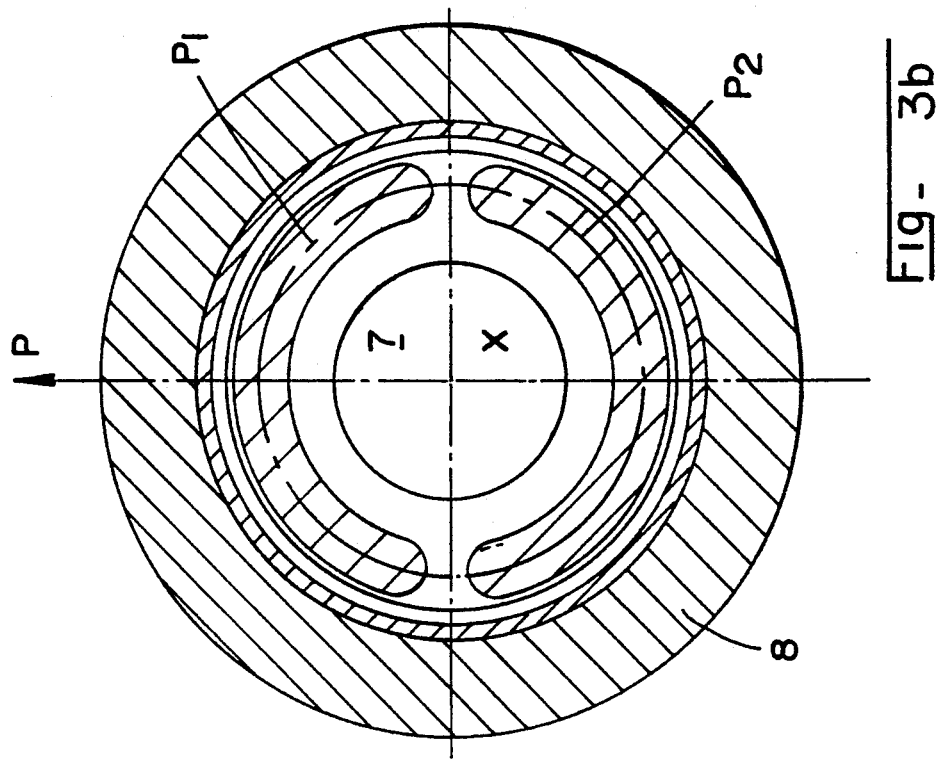
Figure 3A:
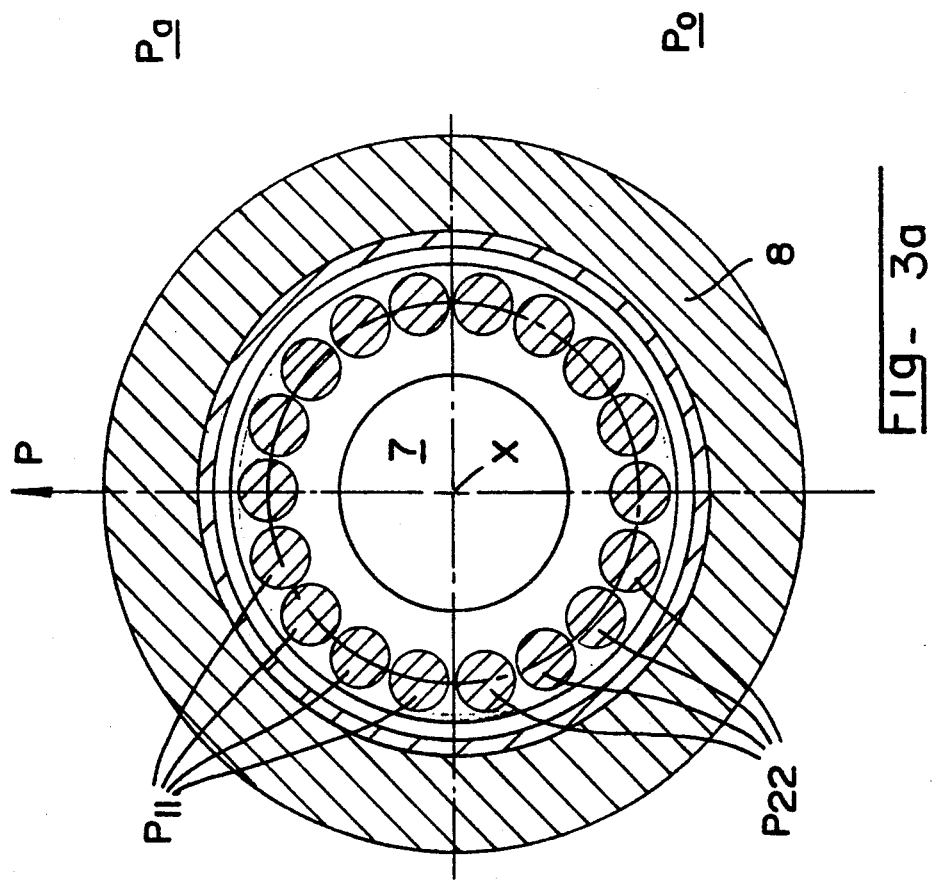

As will be seen from the radial sectional view of FIG. 3a, a plurality of force-exerting elements $P_{11}$ and $P_{22}$ can be arranged adjacent one another at the press side $P_a$ and the opposite side $P_o$, respectively. Here, the pressure chambers 15 of the force-exerting elements $P_{11}$ at the press side $P_a$ are interconnected with one another, and equally, the pressure chambers 15 of the force-exerting elements $P_{22}$ at the opposite side $P_o$ are interconnected with one another. An arrangement of this type has the advantage that there can be beneficially used conventional hydrostatic force-exerting elements possessing an approximately circular cross-sectional configuration of the pressure chambers 15, and nonetheless, there can be generated the largest possible rotational moment or torque.

FIG. 3b illustrates a modification, wherein here, however, only a respective single force-exerting element $P_1$ and $P_2$ is arranged at each side $P_a$ and $P_o$, respectively, these force-exerting elements $P_1$ and $P_2$ each having a lengthwise extending, approximately semi-circular curved configuration.

Figure 4:
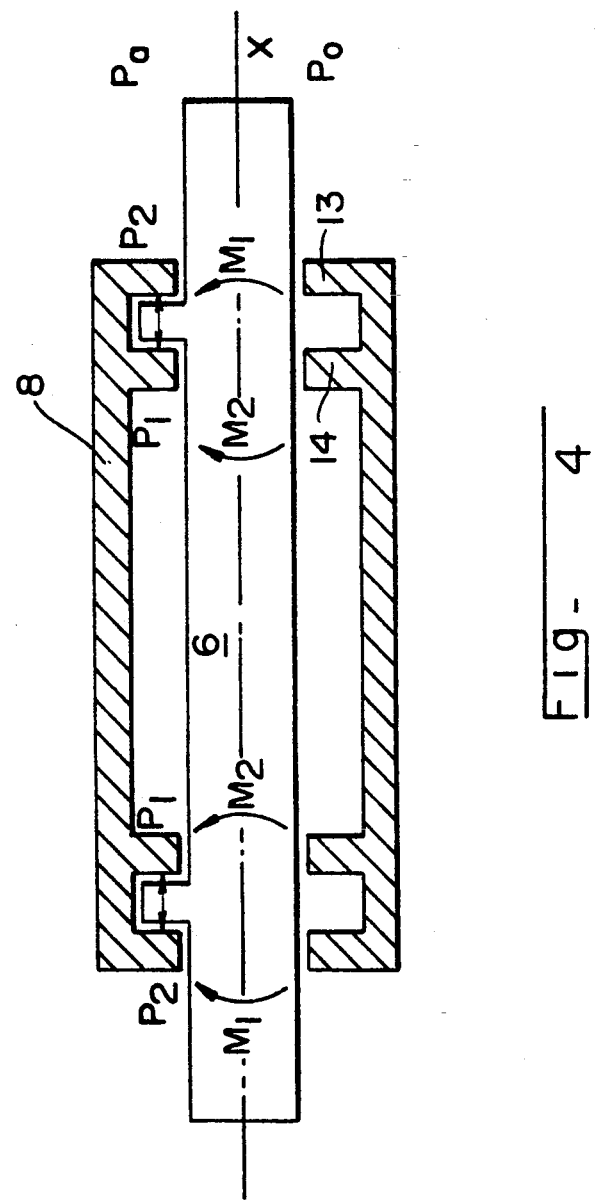
FIG. 4 is a schematic axial sectional view of a further embodiment of controlled deflection roll.

Although with the constructions depicted in FIGS. 1 to 3b, two respective pairs of force-exerting elements $P_{11}$, $P_{12}$, $P_{21}$ and $P_{22}$ are provided at each opposite end of the roll shell 8, the desired rotational moment or torque also can be produced at the opposite ends of the roll shell 8 with a lesser number of force-exerting elements, as such has been depicted for the embodiment shown in FIG. 4.

With this exemplary embodiment depicted in FIG. 4, there are only provided at the press side $P_a$ force-exerting elements $P_1$ effective towards the inside and force-exerting elements $P_2$ effective toward the outside, and at the opposite side $P_o$ there are not present any force-exerting elements. Also, with this construction there is simultaneously produced a rotational moment $M_1$ at both opposite ends of the roll shell 8 when the inwardly effective force-exerting elements $P_1$ are impinged with the hydraulic pressure or pressurized medium, and upon impingement of the other force-exerting elements $P_2$, which are effective towards the outside, there is produced the opposite rotational moment or torque $M_2$.

The force-exerting elements $P_{11}$ and $P_{21}$ also can be simultaneously controlled, however with different pressures of the applied fluid or hydraulic pressure or pressurized medium, and in that case separate pressure medium infeed lines or conduits, such as the schematically depicted lines or conduits $L_3$ and $L_4$ shown in FIG. 2a, are respectively operatively connected with the force-exerting elements $P_{11}$ and $P_{21}$. The same observations are applicable as concerns the other force-exerting elements $P_{12}$ and $P_{22}$.

While there are shown and described present preferred embodiments of the invention, it is distinctly to be understood the invention is not limited thereto, but may be otherwise variously embodied and practiced within the scope of the following claims.

What is claimed is:

1. A controlled deflection roll comprising:
    a stationary support having a lengthwise axis;
    a roll shell rotatable about said stationary support and having oppositely situated ends;
    at least one support device exerting a pressing force in a pressing plane in a predetermined pressing direction;
    said at least one support device supporting said roll shell at the stationary support;
    said roll shell being movable throughout the entire length thereof in the direction of application of the pressing force in the predetermined pressing direction;
    means provided at the region of each ends of the roll shell for exerting a rotational moment;
    said rotational moment exerting means defining an axis which extends substantially perpendicular to the pressing plane;
    said rotational moment exerting means comprising at least one pair of force-exerting elements; and
    said at least one pair of force-exerting elements, being effective in opposite directions with respect to one another approximately in the axial direction of the stationary support at a predetermined distance from the lengthwise axis of the stationary support.

2. The controlled deflection roll as defined in claim 1, wherein:
    said at least one pair of force-exerting elements comprises at least two pairs of force-exerting elements arranged at different sides of the stationary support; and
    each of said at least two pairs of force-exerting elements being effective in a direction extending substantially parallel to the direction of the lengthwise axis of the stationary support.

3. The controlled deflection roll as defined in claim 1, wherein:
    said at least one pair of force-exerting elements comprises two pairs of force-exerting elements;
    one of the pairs of force-exerting elements comprises force-exerting elements arranged approximately at one end of the roll shell and effective substantially parallel to the direction of the lengthwise axis of the stationary support;
    the other pair of force-exerting elements comprises force-exerting elements arranged approximately at the other end of the roll shell and effective substantially parallel to the direction of the lengthwise axis of the stationary support; and
    the force-exerting elements of each pair of force-exerting elements being effective in a direction opposite to one another.

4. The controlled deflection roll as defined in claim 1, further including:
    flange means provided at the stationary support;
    ring means provided at the roll shell; and
    each of said force-exerting elements being arranged between at least one flange means and at least one ring means.

5. The controlled deflection roll as defined in claim 4, wherein:
    at least one respective force-exerting element is arranged in a direction substantially parallel to the lengthwise axis of the stationary support both internally and externally of the flange means and the ring means and acting in opposite directions with respect to one another; and
    each of said respective force-exerting elements being supported at said ring means and said flange means.

6. The controlled deflection roll as defined in claim 5, wherein:
    the controlled deflection roll has a pressing side and a side located opposite to said pressing side; and
    means for controlling said force-exerting elements such that force-exerting elements located at said pressing side exert upon the ring means a pressing force in a predetermined direction and force-exerting elements located at said side located opposite to said pressing side exert an oppositely directed pressing force.

7. The controlled deflection roll as defined in claim 6, further including:

separate pressure line means operatively connected with the force-exerting elements located at said pressing side and the force-exerting elements located at said opposite side for exerting a different pressure upon the force-exerting elements located at the pressing side and the force-exerting elements located at the opposite side.

8. The controlled deflection roll as defined in claim 1, further including:
means for conjointly controlling force-exerting elements arranged at the region of the respective ends of the roll shell and exerting a rotational moment.

9. The controlled deflection roll as defined in claim 1, wherein:
said at least one pair of force-exerting elements comprise hydrostatic force-exerting elements;
pressure chamber means to which there can be supplied pressurized medium provided for each of the hydrostatic force-exerting elements for displacement of said force-exerting elements in a direction substantially parallel to the lengthwise axis of the stationary support; and
each of said hydrostatic force-exerting elements having hydrostatic bearing pockets in flow communication with an associated pressure chamber means and coacting with the roll shell.

10. The controlled deflection roll as defined in claim 1, further including:
non-rotatable guide means displaceable at least in the predetermined pressing direction in relation to the stationary support; and
said roll shell being mounted at said non-rotatable guide means.

11. The controlled deflection roll as defined in claim 1, further including:
bearing means; and
said means for exerting said rotational moment being arranged at a region located between an associated end of the roll shell and the bearing means.

12. A deflection roll comprising:
a stationary support having a lengthwise axis;
a roll shell rotatable about said stationary support and having a length between oppositely situated ends;
at least one support device positioned between said stationary support and an inner surface of said roll shell, said at least one support device including means for exerting a pressing force in a pressing plane in a predetermined pressing direction;
means for supporting said roll shell for movement in a direction parallel to said pressing plane throughout said length of said roll shell; and
at a respective region of each of said oppositely situated ends of said roll shell at lest one pair of force-exerting elements for exerting a rotational moment, each said pair of said force-exerting elements defining a respective axis which extend substantially perpendicular to the pressing plane, and each said pair of force-exerting elements further comprise means for exerting a force in opposite directions with respect to one another approximately in the axial direction of the stationary support at a predetermined distance form the lengthwise axis of the stationary support.

13. The deflection roll as defined in claim 12, wherein:
said means for supporting said roll shell for movement in a direction parallel to said pressing plane throughout said length of said roll shell further comprises, at each said region of said oppositely situated ends of said roll shell:
a bearing element; and
a radially displaceable guide device upon which a respective one of said bearing elements is mounted.

14. The deflection roll as defined in claim 12, further comprising:
for each of said oppositely situated ends of said roll shell, an outer ring and an inner ring fixedly attached to said roll shell, wherein
a respective one of said at least one pair of force-exerting elements is positioned between said outer ring and inner ring of a respective one of said oppositely situated ends of said roll shell.

15. The deflection roll as defined in claim 14, wherein:
each of said at least one pair of force-exerting elements positioned at each of said oppositely situated ends of said roll shell comprise means for exerting a force toward said inner ring and means for exerting a force toward said outer ring.

* * * * *